United States Patent
Ran et al.

(10) Patent No.: US 10,570,253 B2
(45) Date of Patent: Feb. 25, 2020

(54) PREPARATION METHOD FOR POLYMER AND APPLICATIONS THEREOF

(71) Applicants: SOBUTE NEW MATERIALS CO., LTD., Nanjing (CN); BOTE BUILDING MATERIALS (TIANJIN) CO., LTD., Nanjing (CN)

(72) Inventors: Qianping Ran, Nanjing (CN); Jiaping Liu, Nanjing (CN); Tao Wang, Nanjing (CN); Jianfeng Ma, Nanjing (CN); Shuai Qi, Nanjing (CN); Shimin Fan, Nanjing (CN); Yong Yang, Nanjing (CN)

(73) Assignee: SOBUTE NEW MATERIALS CO., LTD., Nanjing (CN)

( * ) Notice: Subject to any disclaimer, the term of this patent is extended or adjusted under 35 U.S.C. 154(b) by 0 days.

(21) Appl. No.: 16/067,015

(22) PCT Filed: Nov. 7, 2016

(86) PCT No.: PCT/CN2016/104953
§ 371 (c)(1),
(2) Date: Jun. 28, 2018

(87) PCT Pub. No.: WO2017/113991
PCT Pub. Date: Jul. 6, 2017

(65) Prior Publication Data
US 2019/0010286 A1    Jan. 10, 2019

(30) Foreign Application Priority Data

Dec. 31, 2015    (CN) .......................... 2015 1 1029523

(51) Int. Cl.
| | | |
|---|---|---|
| *C08G 65/335* | (2006.01) | |
| *C08G 65/331* | (2006.01) | |
| *C08G 65/332* | (2006.01) | |
| *C04B 24/24* | (2006.01) | |
| *C04B 28/02* | (2006.01) | |
| *C08G 65/334* | (2006.01) | |
| *C04B 24/22* | (2006.01) | |
| *C04B 103/40* | (2006.01) | |

(52) U.S. Cl.
CPC .......... *C08G 65/3355* (2013.01); *C04B 24/22* (2013.01); *C04B 24/243* (2013.01); *C04B 24/246* (2013.01); *C04B 28/02* (2013.01); *C08G 65/331* (2013.01); *C08G 65/332* (2013.01); *C08G 65/334* (2013.01); *C08G 65/335* (2013.01); *C08G 65/3322* (2013.01); *C04B 2103/408* (2013.01)

(58) Field of Classification Search
CPC .............. C08G 65/3355; C08G 65/331; C08G 65/3322; C04B 2103/408; C04B 24/243; C04B 28/02; C08F 216/1416; C08F 220/06; C08F 222/06
See application file for complete search history.

(56) References Cited

U.S. PATENT DOCUMENTS 9,175,122 B2 *  11/2015  Miao ..................... C04B 24/165

FOREIGN PATENT DOCUMENTS

| CN | 1096774 | | 12/1994 |
|---|---|---|---|
| CN | 10-2503224 | * | 6/2012 |
| CN | 102503224 | | 6/2012 |
| CN | 103183792 | | 7/2013 |
| CN | 10-5037670 | * | 11/2015 |
| CN | 105037670 | | 11/2015 |
| CN | 10-5646871 | * | 6/2016 |
| CN | 105646871 | | 6/2016 |
| EP | 0601536 | | 6/1994 |

* cited by examiner

Primary Examiner — Robert D Harlan
(74) Attorney, Agent, or Firm — Treasure IP Group, LLC

(57) ABSTRACT

The present invention provides a method for preparing a polymer and a use of the polymer. The resulting polymer is used as a dispersant for an aqueous dispersion of a hydraulic binder and/or a latent hydraulic binder, such that water-reducing rate is improved, and suitable control of air content can be achieved, thereby improving the strength of concrete. The method for preparing a polymer includes polycondensation of a polyether macromonomer A of a specific structure, a monomer B and an aldehyde C to obtain the polymer. The monomer B is phenylsulfonic acid, p-/o-aminophenylsulfonic acid, p-/o-hydroxylbenzoic acid, p-/o-aminobenzoic acid, p-/o-hydroxylphenylsulfonic acid, or a phosphoric acid group or phosphorous acid group-containing monomer of a specific structure. A molar ratio of the polyether macromonomer A and the monomer B is 1:(0.5 to 12).

16 Claims, No Drawings

PREPARATION METHOD FOR POLYMER AND APPLICATIONS THEREOF

CROSS REFERENCE TO RELATED APPLICATION

This application claims priority to a PCT application PCT/CN2016/104953 filed on Nov. 7, 2016, which in turn claims priority to a Chinese Application No. CN201511029523.X, filed on Dec. 31, 2015. The PCT and Chinese Applications are incorporated herein by reference in their entireties.

BACKGROUND OF THE INVENTION

Field of the Invention

The present invention relates to a method for preparing a polymer and a use of the polymer, and belongs to the technical field of concrete admixtures.

Description of Related Art

With rapid economic growth in China, the usage amount of concrete increases on the order of tenths of a percent per year, and meanwhile, the technical level of concrete applications is also growing. Among numerous concrete admixtures, a water-reducing agent is one of admixtures that are most widely researched and applied. The water-reducing agent is a surfactant in nature, and is mainly used to improve the flowability of concrete, control the setting or hardening time, and increase the strength of concrete.

A polycarboxylic acid water-reducing agent is a high-performance water-reducing agent, which molecular structure is formed mainly by free radical polymerization of a polyether macromonomer and an unsaturated carboxylic acid molecule. Electrostatic repulsion may occur between carboxylic acid functional groups and a strong steric effect may occur in side chains, so that the carboxylic acid water-reducing agent has higher water-reducing efficiency compared to early water-reducing agents. With wide applications of the carboxylic acid water-reducing agent, improvements in performance thereof are increasingly reported.

A patent document U.S. Pat. No. 5,393,343A introduces a polyoxyalkyleneamine polyether, which may be subjected to amidation with polyacrylic acid to obtain a corresponding polycarboxylic acid water-reducing agent. Such a water-reducing agent has good slump-retaining property. The disadvantage of this method is that a large amount of an organic solvent is required to remove water generated during the reaction, and the product has low solubility in water, so that practical limitations are greatly limited.

A patent document CN1096774A discloses a polycarboxylic acid water-reducing agent for controlling slump loss in concrete. This composition is formed by polymerization of alkenyl ether, dialkenyl ether and maleic anhydride as monomers with azobisisobutyronitrile as an initiator system in a solvent toluene. Although the water-reducing agent in this invention has high slump-retaining properties, the disadvantages are that the water-reducing properties are slightly poor, the required dosage is relatively high, the production process is environmentally unfriendly, and the used raw material alkenyl ether is expensive.

While polycarboxylic acid water-reducing agents have made significant advances in water-reducing and slump-retaining properties, there are two pronounced problems occurring in use. On the one hand, a polycarboxylic acid water-reducing agent molecule itself has high air-entraining effect, resulting in potential great impact on later strength improvement of concrete. In order to address the problem of too high air-entraining effect of the polycarboxylic acid water-reducing agent, it has been reported in patent documents EP601536A1 and EP1138697A1 that a small amount of an anti-foaming agent may be added, so as to substantially decrease the air content in a short term. However, after long-term storage, the problem of poor compatibility may occur, thus resulting in decrease in anti-foaming ability.

A patent document U.S. Pat. No. 6,803,396B2 introduces an anti-foaming agent that is ethylene oxide-propylene oxide block polyether capped with primary amine functional groups. The principle is that the problem of poor compatibility is solved with interaction between primary amine groups and carboxylic acid functional groups. However, it is to be noted that such a polyether is expensive and commercial mass production therefor is difficult.

On the other hand, the polycarboxylic acid water-reducing agent suffers from the problem of poor adaptability for clays. The polycarboxylic acid water-reducing agent has strong adsorption tendency in clays and minerals, and is highly sensitive to the mud content of aggregates, which greatly affects transportation, operating state and strength of concrete. Currently, there are no good solutions for the problem of poor adaptability for clays, and only some combinations of small molecules such as sodium gluconate, sucrose, citric acid, potassium salts, and the like are used to improve the nature of concrete, which cannot fundamentally solve the problem of poor adaptability of polycarboxylic acid water-reducing agents in a region having a high mud content.

SUMMARY OF THE INVENTION

Object of the Invention

One objective of the present invention is to provide a method for preparing a polymer. The resulting polymer is used as a dispersant for an aqueous dispersion of a hydraulic binder and/or a latent hydraulic binder, such that water-reducing rate is improved, and suitable control of air content can be achieved, thereby improving the strength of concrete.

Another objective of the present invention is to provide a use of the polymer as a dispersant.

BRIEF DESCRIPTION OF THE INVENTION

In a first aspect of the present invention, provided is a method for preparing a polymer, comprising polycondensation of a polyether macromonomer A, a monomer B and an aldehyde C, wherein the polyether macromonomer A has a structural formula (Ia), (Ib), (Ic), or (Id):

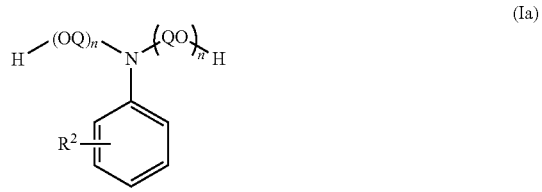

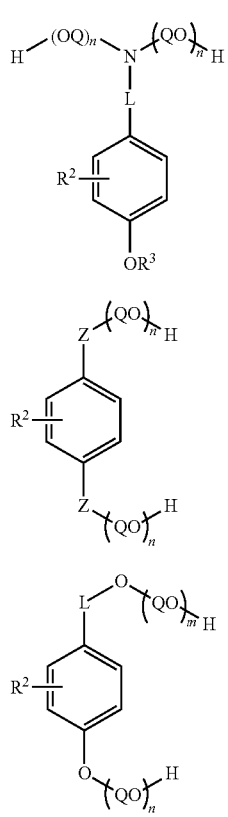

in which Z is NR³, O or O(CH₂)ƒO; L=O(CH₂)ƒ or (CH₂)ƒ; f is an integer from 1 to 10; Q is C2 to C24 alkylene; R² is H or C1 to C10 alkyl, R³ is a C1 to C10 alkyl, m=8~112, n=8~112;

the monomer B is p-/o-aminophenylsulfonic acid, p-/o-hydroxylbenzoic acid, p-/o-aminobenzoic acid, or p-/o-hydroxylphenylsulfonic acid, or has a structural formula (IIa) or (IIb):

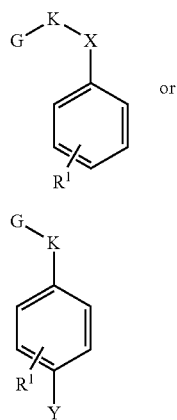

in which G is $N(CH_2\text{—}PO_3H_2)_2$, $NH\text{—}CH_2PO_3H_2$, $NR^6\text{—}CH_2PO_3H_2$, $C(OH)(PO_3H_2)_2$, $CH(OPO_3H_2)$ $CH_2\text{—}OPO_3H_2$, $OPO_3H_2$, wherein R¹ is H, a C1 to C10 alkyl or SO₃H, K is a C1 to C10 alkylene, X=NR⁸ or O, Y is OH or OR⁷, R⁷ is a C1 to C10 alkyl, R⁶ and R⁸ independently from each other are a C1 to C10 alkyl, the aldehyde C has a structural formula (III):

$$R^5CHO \qquad (III)$$

in which R⁵ is H, COOH, or a C1 to C10 alkyl; and
a molar ratio of the polyether macromonomer A and the monomer B is 1:(0.5 to 12).

In the present invention, the alkyl refers to a linear or branched alkyl, and for example, a C1 to C10 alkyl may be methyl, ethyl, n-propyl, isopropyl, n-butyl, isobutyl, sec-butyl, tert-butyl, n-pentyl, isopentyl, sec-amyl, neopentyl, 1,1-dimethyl propyl, 1,2-dimethyl propyl, n-hexyl, isohexyl, sec-hexyl, neohexyl, 3-methyl amyl, 1,1-dimethylbutyl, 1,3-dimethylbutyl, 1-ethyl-butyl, 1-methyl-1-ethyl propyl, n-heptyl and its isomers, n-octyl and its isomers, n-nonyl and its isomers, or n-decyl and its isomers.

The aryl refers to a monocyclic aryl or a cyclic aryl consisting of condensed rings and containing 6 to 10 carbon atoms in the rings, such as phenyl, o-tolyl, m-tolyl, p-tolyl, 1-naphthyl, 2-naphthyl, or indenyl.

The polyether macromonomer A can be obtained by ring opening polymerization of alkylene oxide QO with a benzene derivative containing active H as an initiator, and may be self-prepared or commercially available. The method for self-preparation is well known in the art. Initiator molecules mainly include: hydroquinone, 4-methoxyaniline, 3-methoxyaniline, 2-methoxyaniline, 4-ethoxyaniline, 3-ethoxyaniline, 2-ethoxyaniline, p-hydroxybenzylalcohol, 2-(4-hydroxyphenyl)ethanol, 4-hexyloxyaniline, 4-methoxybenzylamine, 4-methoxyphenylethylamine, 4-methoxyphenylpropylamine, tyramine (CAS: 51-67-2), 4-methylaniline, 4-ethylaniline, 4-n-butylaniline, 4-cyclohexylaniline (CAS: 6373-50-8), cumidine etc. Preferred alkylene oxide QO is at least one of ethylene oxide, propylene oxide, 1-epoxybutane, 2,3-epoxybutane, 2-methyl-1,2-epoxypropane (epoxyisobutane), and 1-epoxypentane. More preferably, ethylene oxide/propylene oxide is used in the present invention. In particular, pure ethylene oxide or a mixture of ethylene oxide and propylene oxide is used, where the weight percent of ethylene oxide in the mixture is at least 80%, and in this case, polyether chains of a block structure or a random structure may be selected. The polyether macromonomer A has a molecular weight of preferably 1000 to 10000, more preferably 1000 to 5000.

The monomer B contains a carboxylic group, sulfonic group, phosphoric acid group, or phosphorous acid group to provide the polymer with an adsorption group. The monomers B containing a carboxylic group or sulfonic group are commercially available, and the monomers B containing a phosphorous acid group or phosphoric acid group may be self-prepared following known methods in the art.

The monomer B containing a phosphorous acid group may be mainly divided into three classes according to different adsorption functional groups G.

1. When G is $N(CH_2\text{—}PO_3H_2)_2$, $NH\text{—}CH_2PO_3H_2$ or $NR^6\text{—}CH_2PO_3H_2$, the Mannich reaction in organic chemistry is used for self-preparation: to a corresponding amine substrate such as 2-phenoxyethylamine, based on the equivalent of reactive amino-hydrogen atoms (amino group attached to the phenyl ring does not participate in the reaction), 2 eq of phosphorous acid is added, about 0.5 eq of sulfuric acid or about 1.1 eq of hydrochloric acid is added, and the reaction mixture is heated to 100° C. Then, 2.2 eq of a 37% aqueous formaldehyde solution is added, and heated to reflux for 24 to 48 h. The crude reaction product is washed three times with cold methanol, and the residual methanol and water are removed by vacuum suction, to obtain a bidentate phosphoric acid product. It should be particularly noted that, for an amine substrate containing a phenolic hydroxyl group, the reaction is conducted under inert gas protection, and for synthesis of a product where the adsorption functional group G is a monodentate phosphoric acid functional group such as $NH-CH_2PO_3H_2$, $NR^6-CH_2PO_3H_2$, halving the amounts of phosphorous acid and the aldehyde is required.

2. When G is $C(OH)(PO_3H_2)_2$, the following method is used: to a corresponding carboxylic substrate containing a phenyl ring such as 3-phenoxypropionic acid, based on the equivalent of the carboxylic group, 3 to 4 eq of phosphorus trichloride is added in a certain period and heated to 75° C. for 12 h, and then an amount of water is added and heated to 105° C. for hydrolysis for 1 h. The reaction is cooled to room temperature. Water in the reaction is removed by distillation under reduced pressure, and then the crude reaction product is washed three times with cold methanol, and the residual methanol is removed by vacuum suction, to obtain a final targeted product.

3. When G is $CH(OPO_3H_2)CH_2-OPO_3H_2$, $OPO_3H_2$, the following method is used: to a corresponding alcoholic substrate such as propylene glycol phenyl ether, an equimolar amount or slight excess (no greater than a 10% excess) of a phosphoric acid reagent is added for etherification, where toluene or xylene is used as solvent and the reaction is maintained at reflux for 24 to 48 h at 110 to 130° C. After the reaction was finished, the excess toluene is removed by distillation under reduced pressure, to obtain a corresponding phosphate monomer.

The aldehyde C may be an alkyl aldehyde such as formaldehyde, acetaldehyde or propionaldehyde, or an aromatic aldehyde such as benzaldehyde or phenylacetaldehyde, or may be glyoxylic acid.

The polycondensation is a polycondensation of the polyether macromonomer A and the monomer B with the aldehyde, which is a reaction type well known by those skilled in the art. Since neutralization with a base (generally the pH value after neutralization is about 10) is further required after the polycondensation is finished, in this case, the acidic adsorption group contained in the polymer will be converted into a salt group. This conversion has no significant effect on molecular weight, and is ignored in the present invention.

Specific reaction steps and conditions may be experimentally determined in connection with general experiences in the art. Generally, removal of unreacted aldehyde C is further required after the polycondensation is finished. Specific preparation steps include:

An aldehyde C is dropwise added to a mixture of a polyether macromonomer A and a monomer B for polycondensation. The conditions of the polycondensation are: preferably, a reaction temperature of 80 to 140° C. and a reaction time of 1 to 8 h, and more preferably, a reaction temperature of 90 to 130° C. and a reaction time of 2 to 6 h.

The pH is adjusted, the reaction lasts for a certain period, and unreacted aldehyde C is removed.

For good storage stability, the final concentration of the product needs be adjusted to be no greater than 40%, preferably 30% to 40%, where the percentage is weight percent.

Preferably,

Z is O or $O(CH_2)_fO$, $f=1$ to 3, more preferably $f=1$ to 2, most preferably Z is O;

L is $(CH_2)_f$, $f=1$ to 3;

Q is C2 to C4 alkylene, preferably C2 to C4 alkylene, more preferably $CH_2CH_2$;

$R^1$ is H or a C1 to C3 alkyl, more preferably H;

$R^2$ is H or a C1 to C3 alkyl, more preferably H;

$R^3$ is a C1 to C3 alkyl, more preferably methyl;

X is $NR^8$ or O, $R^8$ is a C1 to C3 alkyl, more preferably methyl or ethyl, most preferably methyl;

Y is OH or $OR^7$, $R^7$ is preferably a C1 to C3 alkyl, more preferably methyl or ethyl, most preferably methyl;

K is a C1 to C3 alkylene; and $R^5$ is H, COOH or a C1 to C3 alkyl, more preferably H or COOH.

The polymer has a weight average molecular weight of preferably 4000 to 150000, more preferably 8000 to 100000, most preferably 10000 to 40000.

Preferably, a molar ratio of the polyether macromonomer A and the monomer B (hereinafter abbreviated AB) is 1:(1.0 to 6.0).

Preferably, a molar ratio of the aldehyde C and (the polyether macromonomer A and the monomer B) is 1.0 to 2.0.

According to the customary practice in the art, the polycondensation uses an acid as catalyst, and the catalyst is preferably concentrated sulfuric acid, phosphoric acid, methanesulfonic acid, p-toluene sulfonic acid, oxalic acid, concentrated hydrochloric acid, and other inorganic acids. The amount of the catalyst used is preferably 0.2 to 8.0 times, more preferably 0.5 to 4.0 times that of the polyether macromonomer A.

In a second aspect of the present invention, provided is a use of the polymer as a dispersant for an aqueous dispersion of a hydraulic binder and/or a latent hydraulic binder. Generally, the hydraulic binder is at least one of cement, lime, gypsum, and anhydrous gypsum, preferably cement, and the latent hydraulic binder is pozzolana, fly ash or blast furnace slag. Based on the hydraulic binder and/or the latent hydraulic binder, the dosage of the polymer of the present invention is 0.01 wt % to 10 wt %, particularly 0.05 wt % to 5 wt %.

It is to be noted that in the present invention, most of the polyether macromonomer A and most of the monomer B participate in the reaction and are converted into the polymer containing a phosphoric acid group, with a conversion rate of above 80%. The product can be directly used without separation of unreacted monomers and byproducts, and the dispersion effect is not significantly affected.

The present invention has the following advantageous effects:

(1) With introduction of the two symmetrical polyether chains in the polyether monomer, stronger steric effect can be generated, which is greatly advantageous to increase the water-reducing rate of the polymer; and also, with reasonable introduction of the two polyether chains, suitable control of air content is achieved, and after the air content is decreased, the strength of concrete is significantly increased at 3d, 7d and 28d.

(2) With strong coordination ability of a sulfonic functional group and a phosphoric acid functional group, faster adsorption to the surface of cement particles can be achieved, which is advantageous to solve the problem of poor adaptability of existing water-reducing agents for clays.

(3) When the monomer B has a structural formula (IIa) or (IIb) and G is $N(CH_2-PO_3H_2)_2$, $C(OH)(PO_3H_2)_2$, or $CH(OPO_3H_2)CH_2-OPO_3H_2$, the polymer of the present invention contains a bidentate phosphoric acid structure, and due to strong coordination ability of the bidentate phosphoric acid, faster adsorption to the surface of cement particles can be achieved, and rapid hydrolysis in a strong base (pH>14 in concrete) resulting in a failure is less likely to occur, such that the water-reducing rate is high, the slump-retaining property is good, and the problem of poor adaptability of existing water-reducing agents for clays can be better solved.

(4) The polyether macromonomer A having a structural formula (Ic) contains multiple reaction sites, so cross-linking may occur among a part of the monomers (due to low polymerization activity of the polyether macromonomer of this structure, a small part of the monomers is subjected to cross-linking, and the water solubility and the adsorptive capacity of the final product are not affected), which is of importance on increasing the molecular weight of the condensate and improving the slump-retaining ability.

DETAILED DESCRIPTION OF THE INVENTION

The present invention will be described in detail by way of examples, and these examples are merely illustrative and should not be construed as limiting the invention thereto. All chemicals or reagents used in the examples are of analytical grade and are commercially available.

In the examples of the present invention, the molecular weight of the polymer is determined by Gel Permeation Chromatography (GPC), and the molecular weight in the present invention is weight average molecular weight (Mw); the reaction conversion rate can be obtained by determination by GPC and calculation of the residual amount of the polyether macromonomer, and clearly, the conversion rate here refers to the conversion rate of the polyether macromonomer A.

The GPC in the above tests is produced by Wyatt Technology Corporation, where the conditions are as follows: gel column: Shodex SB806+803 columns in series; eluant: 0.1M $NaNO_3$ solution; mobile phase velocity: 0.8 ml/min; injection: 20 µl 0.5% aqueous solution; detector: Shodex RI-71 differential refractive index detector; standard: PEG GPC calibration standards (Sigma-Aldrich, molecular weight 1010000, 478000, 263000, 118000, 44700, 18600, 6690, 1960, 628, 232).

In all the application examples of the present invention, unless otherwise stated, the cement used is JIANGNAN-Onoda cement (P.O 42.5), and the stone is continuously graded broken stone having a particle size of 5 to 20 mm. The sand is shown in Table 2.0. Fluidity of cement paste is tested according to the GB/T8077-2000 standard, where using 300 g cement and 87 g water addition, the fluidity of cement paste is determined on a flat glass after stirring for 3 min. The results are shown in Table 1.0. The properties of concrete mixed with the polymer of the present invention are tested with reference to related provisions in JC473-2001—"Pumping Aid for Concrete".

The polyether macromonomers A used in the examples are numbered as follows:

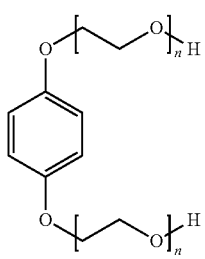

M1

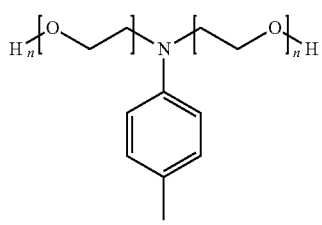

M2

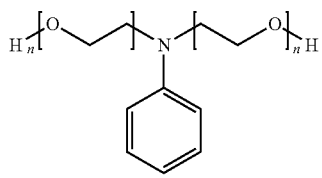

M3

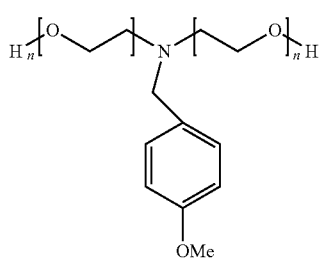

M4

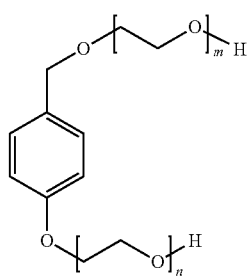

M5

A part of the monomers B used are numbered as follows:

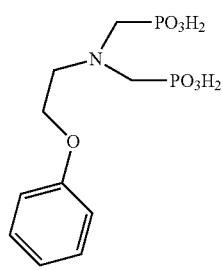

P-1

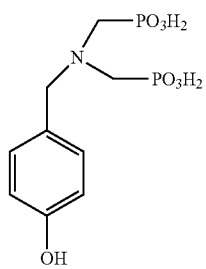

P-2

-continued

P-3
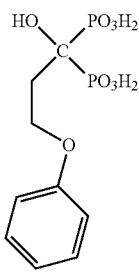

P-4
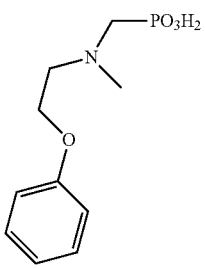

P-5
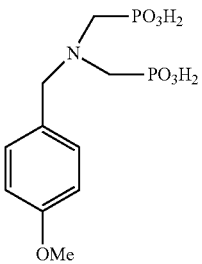

P-6
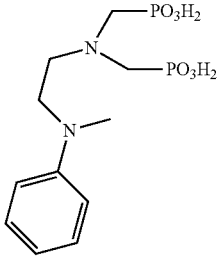

Specific preparation of the part of the monomers B is as follows:

For the phosphorous-containing monomers A, P-1, P-2, P-4, P-5, and P-6 compounds, the Mannich reaction in organic chemistry is used. For example, for P-1, 16.4 g phosphorous acid (0.2 mol) and 12 g (0.11 mol) 35 wt % hydrochloric acid (or 0.5 mol sulfuric acid) are added into 13.8 g (0.1 mol) 2-phenoxyethylamine, and placed in a 500 ml three-necked flask, and the reaction mixture is heated to 100° C. for 5 h. Then, 17.8 g (0.22 mol) of a 37% aqueous formaldehyde solution is added, and heated to reflux for 24 h. The crude reaction product is washed three times with cold methanol, and the residual methanol and water are removed by distillation under reduced pressure, to obtain 31.8 g of a product with a yield of 98%. It is to be noted that for P-2, inert gas protection is required, and for P-4, halving the amounts of phosphorous acid and the aldehyde is required.

Preparation of phosphorous-containing monomer P-3: 16.6 g (0.1 mol) 3-phenoxypropionic acid is placed in a 250 ml three-necked flask, 43.94 g (0.32 mol) phosphorus trichloride is added within 30 min and heated to 75° C. for 12 h, and then 101.1 g (5.6 mol) water is added and heated to 105° C. for hydrolysis for 1 h. The reaction is cooled to room temperature. Water in the reaction is removed by distillation under reduced pressure, and then the crude reaction product is washed three times with cold methanol, and the residual methanol is removed by vacuum suction, to obtain a final targeted product with a yield of 75%. Other similar structures may be prepared following this method.

Polyether macromonomers are prepared by the ethoxylation method, and the description is made here with the preparation of the polyether macromonomer M1 as an example. Hydroquinone is used as initiator, sodium hydroxide is used as catalyst, and ethylene glycol dimethyl ether is used as reaction solvent (for dissolving the initiator). 110 g ethylene glycol dimethyl ether and 3 g sodium hydroxide are added to 110 g hydroquinone, these materials are added to a reactor, and the reactor is evacuated to −0.1 MPa at room temperature. Then, the reactor is heated to 100° C., 50 g ethylene oxide is charged into the reactor, and decrease in pressure and increase in temperature in the reactor indicates beginning of the polymerization reaction. 1840 g ethylene oxide is further charged into the reactor, the reactor is maintained at a temperature of between 100 and 120° C. and a pressure of between 0.2 and 0.4 MPa during the addition, and after the addition of ethylene oxide is finished, the temperature is kept at 100° C. for about 1 h. Once the pressure of the reactor does not decrease again, the temperature and the pressure of the reactor are respectively reduced to about 90° C. and −0.1 MPa, and the solvent ethylene glycol dimethyl ether is removed by distillation under reduced pressure. Once no solvent is distilled off, a relief valve is opened to reduce the pressure in the reactor to normal pressure, the reactor is opened to discharge the material, to obtain a light brown liquid, which is determined by GPC to have a molecular weight of 1973 with a molecular weight distribution of 1.02. It is to be noted that for an initiator having a low melting point, the ethoxylation reaction may be directly performed without dissolution by adding ethylene glycol dimethyl ether.

EXAMPLE 1

In this example, A/B=1:2, C/(A+B)=1.2.

In a 1000 ml four-necked flask equipped with an electro-mechanical stirrer and a thermostatic heating bath, 250 g (0.25 mol) polyether M1 (Mw=1000), 87 g (0.50 mol) p-hydroxylphenylsulfonic acid, 45 g (2.5 mol) water, and 25 g (0.25 mol) sulfuric acid were added, heated and stirred to be a homogeneous one phase system. Then, 72.9 g (0.9 mol) of a 37% aqueous formaldehyde solution was dropwise added in half an hour. After the dropwise addition was completed, the reaction lasted for 5 h at 100° C. After the reaction was finished, it was cooled to room temperature, neutralized with a 30% base solution to a pH of about 10, and further reacted for 0.5 to 1 h at 110° C. to remove unreacted formaldehyde. The reaction was cooled to room temperature, and diluted with water to a solution concentration of about 30% to 40%.

EXAMPLE 2

In this example, A/B=1:2, C/(A+B)=1.0.

In a 1000 ml four-necked flask equipped with an electro-mechanical stirrer and a thermostatic heating bath, 500 g (0.25 mol) polyether M1 (Mw=2000), 162.5 g (0.50 mol) P-1, 45 g (2.5 mol) water, and 25 g (0.25 mol) sulfuric acid were added, and heated and stirred to be a homogeneous one phase system. Then, 60.75 g (0.75 mol) of a 37% aqueous formaldehyde solution was dropwise added in half an hour. After the dropwise addition was completed, the reaction lasted for 5 h at 100° C. After the reaction was finished, it was cooled to room temperature, neutralized with a 30% base solution to a pH of about 10, and further reacted for 0.5 to 1 h at 110° C. to remove unreacted formaldehyde. The reaction was cooled to room temperature, and diluted with water to a solution concentration of about 30% to 40%.

EXAMPLE 3

In this example, A/B=1:2, C/(A+B)=1.0.

In a 1000 ml four-necked flask equipped with an electro-mechanical stirrer and a thermostatic heating bath, 250 g (0.25 mol) polyether M1 (Mw=1000), 162.5 g (0.50 mol) P-1, 90 g (5.0 mol) water, and 25 g (0.25 mol) sulfuric acid were added, and heated and stirred to be a homogeneous one phase system. Then, 60.75 g (0.75 mol) of a 37% aqueous formaldehyde solution was dropwise added in half an hour. After the dropwise addition was completed, the reaction lasted for 6 h at 90° C. After the reaction was finished, it was cooled to room temperature, neutralized with a 30% base solution to a pH of about 10, and further reacted for 0.5 to 1 h at 110° C. to remove unreacted formaldehyde. The reaction was cooled to room temperature, and diluted with water to a solution concentration of about 30% to 40%.

EXAMPLE 4

In this example, A/B=1:3, C/(A+B)=1.0.

In a 5 L four-necked flask equipped with an electro-mechanical stirrer and a thermostatic heating bath, 250 g (0.25 mol) polyether M1 (Mw=1000), 233.7 g (0.75 mol) P-2, 90 g (5.0 mol) water, and 25 g (0.25 mol) sulfuric acid were added, and heated and stirred to be a homogeneous one phase system. Then, 81 g (1.0 mol) of a 37% aqueous formaldehyde solution was dropwise added in half an hour. After the dropwise addition was completed, the reaction lasted for 2 h at 130° C. After the reaction was finished, it was cooled to room temperature, neutralized with a 30% base solution to a pH of about 10, and further reacted for 0.5 to 1 h at 110° C. to remove unreacted formaldehyde. The reaction was cooled to room temperature, and diluted with water to a solution concentration of about 30% to 40%.

EXAMPLE 5

In this example, A/B=1:2, C/(A+B)=1.0.

In a 2000 ml four-necked flask equipped with an electro-mechanical stirrer and a thermostatic heating bath, 1000 g (0.25 mol) polyether M2 (Mw=4000), 156 g (0.50 mol) P-3, 90 g (5.0 mol) water, and 25 g (0.25 mol) sulfuric acid were added, and heated and stirred to be a homogeneous one phase system. Then, 60.75 g (0.75 mol) of a 37% aqueous formaldehyde solution was dropwise added in half an hour. After the dropwise addition was completed, the reaction lasted for 5 h at 100° C. After the reaction was finished, it was cooled to room temperature, neutralized with a 30% base solution to a pH of about 10, and further reacted for 0.5 to 1 h at 110° C. to remove unreacted formaldehyde. The reaction was cooled to room temperature, and diluted with water to a solution concentration of about 30% to 40%.

EXAMPLE 6

In this example, A/B=1:3, C/(A+B)=2.0.

In a 1000 ml four-necked flask equipped with an electro-mechanical stirrer and a thermostatic heating bath, 500 g (0.25 mol) polyether M3 (Mw=2000), 183.81 g (0.75 mol) P-4, 90 g (5.0 mol) water, and 25 g (0.25 mol) sulfuric acid were added, and heated and stirred to be a homogeneous one phase system. Then, 162 g (2.0 mol) of a 37% aqueous formaldehyde solution was dropwise added in half an hour. After the dropwise addition was completed, the reaction lasted for 5 h at 100° C. After the reaction was finished, it was cooled to room temperature, neutralized with a 30% base solution to a pH of about 10, and further reacted for 0.5 to 1 h at 110° C. to remove unreacted formaldehyde. The reaction was cooled to room temperature, and diluted with water to a solution concentration of about 30% to 40%.

EXAMPLE 7

In this example, A/B=1:4, C/(A+B)=1.6.

In a 1000 ml four-necked flask equipped with an electro-mechanical stirrer and a thermostatic heating bath, 500 g (0.25 mol) polyether M4 (Mw=2000), 325 g (1.0 mol) P-1, 90 g (5.0 mol) water, and 25 g (0.25 mol) sulfuric acid were added, and heated and stirred to be a homogeneous one phase system. Then, 162 g (2.0 mol) of a 37% aqueous formaldehyde solution was dropwise added in half an hour. After the dropwise addition was completed, the reaction lasted for 5 h at 100° C. After the reaction was finished, it was cooled to room temperature, neutralized with a 30% base solution to a pH of about 10, and further reacted for 0.5 to 1 h at 110° C. to remove unreacted formaldehyde. The reaction was cooled to room temperature, and diluted with water to a solution concentration of about 30% to 40%.

EXAMPLE 8

In this example, A/B=1:2, C/(A+B)=1.0.

In a 1000 ml four-necked flask equipped with an electro-mechanical stirrer and a thermostatic heating bath, 500 g (0.25 mol) polyether M4 (Mw=2000), 69 g (0.50 mol) p-hydroxylphenylbenzoic acid, 45 g (2.5 mol) water, and 25 g (0.25 mol) sulfuric acid were added, heated and stirred to be a homogeneous one phase system. Then, 111 g (0.75 mol) of a 50% aqueous glyoxylic acid solution was dropwise added in half an hour. After the dropwise addition was completed, the reaction lasted for 5 h at 100° C. After the reaction was finished, it was cooled to room temperature, neutralized with a 30% base solution to a pH of about 10, and further reacted for 0.5 to 1 h at 110° C. to remove unreacted formaldehyde. The reaction was cooled to room temperature, and diluted with water to a solution concentration of about 30% to 40%.

EXAMPLE 9

In this example, A/B=1:1, C/(A+B)=1.2.

In a 1000 ml four-necked flask equipped with an electro-mechanical stirrer and a thermostatic heating bath, 250 g (0.25 mol) polyether M4 (Mw=1000), 81.1 g (0.25 mol) P-1, 45 g (2.5 mol) water, and 34.2 g (0.25 mol, 70% aqueous solution) methanesulfonic acid were added, and heated and stirred to be a homogeneous one phase system. Then, 44.4 g (0.3 mol) of a 50% aqueous glyoxylic acid solution and 24.3 g (0.3 mol) of a 37% aqueous formaldehyde solution were dropwise added in half an hour. After the dropwise addition was completed, the reaction lasted for 5 h at 100° C. After the reaction was finished, it was cooled to room temperature, neutralized with a 30% base solution to a pH of about 10, and further reacted for 0.5 to 1 h at 110° C. to remove unreacted formaldehyde. The reaction was cooled to room temperature, and diluted with water to a solution concentration of about 30% to 40%.

EXAMPLE 10

In this example, A/B=1:2, C/(A+B)=1.33.

In a 1000 ml four-necked flask equipped with an electromechanical stirrer and a thermostatic heating bath, 250 g (0.25 mol) polyether M4 (Mw=1000), 162.2 g (0.5 mol) P-1, 45 g (2.5 mol) water, and 34.2 g (0.25 mol, 70% aqueous solution) methanesulfonic acid were added, and heated and stirred to be a homogeneous one phase system. Then, 81 g (1.0 mol) of a 37% aqueous formaldehyde solution was dropwise added in half an hour. After the dropwise addition was completed, the reaction lasted for 5 h at 105° C. After the reaction was finished, it was cooled to room temperature, neutralized with a 30% base solution to a pH of about 10, and further reacted for 0.5 to 1 h at 110° C. to remove unreacted formaldehyde. The reaction was cooled to room temperature, and diluted with water to a solution concentration of about 30% to 40%.

EXAMPLE 11

In this example, A/B=1:6, C/(A+B)=1.0.

In a 1000 ml four-necked flask equipped with an electromechanical stirrer and a thermostatic heating bath, 500 g (0.25 mol) polyether M1 (Mw=2000), 487.5 g (1.50 mol) P-1, 45 g (2.5 mol) water, and 50 g (0.5 mol) sulfuric acid were added, and heated and stirred to be a homogeneous one phase system. Then, 141.75 g (1.75 mol) of a 37% aqueous formaldehyde solution was dropwise added in half an hour. After the dropwise addition was completed, the reaction lasted for 5 h at 100° C. After the reaction was finished, it was cooled to room temperature, neutralized with a 30% base solution to a pH of about 10, and further reacted for 0.5 to 1 h at 110° C. to remove unreacted formaldehyde. The reaction was cooled to room temperature, and diluted with water to a solution concentration of about 30% to 40%.

EXAMPLE 12

In this example, A/B=1:2, C/(A+B)=1.33.

In a 1000 ml four-necked flask equipped with an electromechanical stirrer and a thermostatic heating bath, 500 g (0.25 mol) polyether M5 (Mw=2000), 169 g (0.50 mol) P-6, 45 g (2.5 mol) water, and 50 g (0.5 mol) sulfuric acid were added, and heated and stirred to be a homogeneous one phase system. Then, 81 g (1.0 mol) of a 37% aqueous formaldehyde solution was dropwise added in half an hour. After the dropwise addition was completed, the reaction lasted for 5 h at 100° C. After the reaction was finished, it was cooled to room temperature, neutralized with a 30% base solution to a pH of about 10, and further reacted for 0.5 to 1 h at 110° C. to remove unreacted formaldehyde. The reaction was cooled to room temperature, and diluted with water to a solution concentration of about 30% to 40%.

EXAMPLE 13

In this example, A/B=1:2, C/(A+B)=1.33.

In a 1000 ml four-necked flask equipped with an electromechanical stirrer and a thermostatic heating bath, 500 g (0.25 mol) polyether M5 (Mw=2000), 162.5 g (0.50 mol) P-5, 45 g (2.5 mol) water, and 25 g (0.25 mol) sulfuric acid were added, and heated and stirred to be a homogeneous one phase system. Then, 81 g (1.0 mol) of a 37% aqueous formaldehyde solution was dropwise added in half an hour. After the dropwise addition was completed, the reaction lasted for 5 h at 100° C. After the reaction was finished, it was cooled to room temperature, neutralized with a 30% base solution to a pH of about 10, and further reacted for 0.5 to 1 h at 110° C. to remove unreacted formaldehyde. The reaction was cooled to room temperature, and diluted with water to a solution concentration of about 30% to 40%.

COMPARATIVE EXAMPLE

The preparation of the comparative example was made with reference to Example 5 disclosed in a Chinese invention patent CN 103183792 B.

Fluidity of cement paste was tested according to the GB/T 8077-2000—"Methods for testing uniformity of concrete admixture", where the used cement was Onoda cement (300 g) and the water/cement ratio was 0.29. The results are shown in Table 1.0.

TABLE 1.0

Conversion rate of polymerization and fluidity of paste

| No. | Mw | PDI | Conversion rate (%) | Dosage | Paste (mm) |
|---|---|---|---|---|---|
| Example 1 | 21385 | 1.56 | 94 | 1.1‰ | 242 |
| Example 2 | 22356 | 1.63 | 93 | 1.0‰ | 254 |
| Example 3 | 20396 | 1.72 | 92 | 1.0‰ | 263 |
| Example 4 | 25642 | 1.65 | 89 | 1.0‰ | 258 |
| Example 5 | 23654 | 1.66 | 90 | 1.0‰ | 253 |
| Example 6 | 21089 | 1.73 | 95 | 1.0‰ | 254 |
| Example 7 | 22356 | 1.59 | 93 | 1.0‰ | 262 |
| Example 8 | 30000 | 1.63 | 90 | 1.1‰ | 258 |
| Example 9 | 39657 | 1.82 | 91 | 1.0‰ | 249 |
| Example 10 | 21934 | 1.89 | 87 | 1.0‰ | 232 |
| Example 11 | 11293 | 1.52 | 81 | 1.1‰ | 210 |
| Example 12 | 21323 | 1.49 | 88 | 1.0‰ | 249 |
| Example 13 | 20357 | 1.56 | 89 | 1.0‰ | 233 |
| Comparative Example | 24100 | 1.15 | 92 | 1.2‰ | 223 |

The properties of concrete mixed with the polymer of the present invention were tested with reference to related provisions in JC473-2001—"Pumping Aid for Concrete", and the air content was tested with reference to related provisions in GB8076-2008—"Concrete Admixtures". The sand samples as shown in Table 2.0 were used in these tests. The results are shown in Tables 3.0 and 4.0.

TABLE 2.0

Data of sand samples

| Sand sample No. | Origin | Fineness modulus | Mud content (%) |
|---|---|---|---|
| Sand sample 1 | Hunan-Dongting Lake sand | 2.9 | 2.3 |
| Sand sample 2 | Mingguang | 2.6 | 3.7 |

TABLE 3.0

Testing results of concrete

| Sand sample | Admixture | Dosage (solid content %) | Slump (mm) Initial | 1 h | Strength (MPa) 3 d | 7 d | 28 d |
|---|---|---|---|---|---|---|---|
| Sand sample 1 | Example 1 | 0.15 | 227 | 203 | 19.8 | 31.8 | 40.1 |
| | Example 2 | 0.14 | 224 | 200 | 20.5 | 33.1 | 40.5 |
| | Example 3 | 0.14 | 218 | 203 | 20.3 | 30.8 | 40.7 |
| | Example 4 | 0.15 | 223 | 207 | 21.7 | 32.1 | 40.9 |
| | Example 5 | 0.14 | 221 | 206 | 21.2 | 30.9 | 40.3 |
| | Example 6 | 0.16 | 228 | 203 | 21.0 | 30.7 | 40.8 |
| | Example 7 | 0.14 | 236 | 219 | 21.5 | 31.5 | 41.5 |
| | Example 8 | 0.16 | 227 | 205 | 21.8 | 31.9 | 41.6 |
| | Example 9 | 0.14 | 231 | 210 | 22.9 | 32.0 | 42.5 |
| | Example 10 | 0.15 | 223 | 200 | 21.3 | 30.3 | 41.2 |
| | Example 11 | 0.16 | 212 | 195 | 20.3 | 29.3 | 40.2 |
| | Example 12 | 0.15 | 237 | 215 | 21.9 | 31.7 | 41.5 |
| | Example 13 | 0.15 | 229 | 207 | 22.8 | 32.9 | 40.6 |
| | Comparative Example | 0.17 | 225 | 170 | 18.3 | 27.7 | 37.6 |
| Sand sample 2 | Example 1 | 0.16 | 223 | 202 | 21.8 | 31.2 | 39.7 |
| | Example 2 | 0.16 | 221 | 198 | 20.6 | 30.9 | 38.9 |
| | Example 3 | 0.16 | 218 | 195 | 21.0 | 31.7 | 39.6 |
| | Example 4 | 0.16 | 224 | 201 | 20.4 | 30.8 | 38.3 |
| | Example 5 | 0.16 | 217 | 198 | 21.1 | 31.9 | 39.3 |
| | Example 6 | 0.16 | 224 | 203 | 21.6 | 31.5 | 39.7 |
| | Example 7 | 0.16 | 225 | 199 | 20.9 | 30.5 | 40.7 |
| | Example 8 | 0.18 | 231 | 171 | 21.3 | 31.6 | 40.3 |
| | Example 9 | 0.16 | 229 | 208 | 20.5 | 29.5 | 39.2 |
| | Example 10 | 0.17 | 221 | 203 | 22.3 | 31.0 | 40.5 |
| | Example 11 | 0.18 | 223 | 193 | 20.3 | 29.3 | 38.2 |
| | Example 12 | 0.16 | 229 | 209 | 21.7 | 30.9 | 40.6 |
| | Example 13 | 0.16 | 237 | 215 | 22.8 | 31.7 | 42.5 |
| | Comparative Example | 0.19 | 223 | 157 | 18.4 | 27.3 | 35.5 |

It can be known from Table 3.0 that, compared to the comparative sample, in sand having a higher mud content, both the water-reducing and slump-retaining properties of phosphoric acid water-reducing agents as reported in the present invention are substantially improved. In particular, the dosages of the bidentate phosphoric acid products are low (examples 2-5, 7, 9-10, 12-13), while the water-reducing properties of the samples of water-reducing agents synthesized from sulfonic group-containing monomers and monodentate phosphoric acid monomers are slightly reduced compared to the bidentate samples, but are still better than the comparative sample, and the slump-retaining properties thereof are significantly improved (examples 1 and 6). In contrast, the carboxylic monomer (e.g., p-hydroxylphenylbenzoic acid in example 8) exhibits non-adaptability for concrete having a higher mud content and has an inferior effect compared to others. In addition, compared to the standard sample, all the samples synthesized from bispolyether have controlled air-entraining ability, and the strength is increased at 3d, 7d and 28d.

TABLE 4.0

Air content

| Admixture | Air content |
|---|---|
| Example 1 | 3.5 |
| Example 2 | 3.0 |
| Example 3 | 3.1 |
| Example 4 | 3.3 |
| Example 5 | 3.0 |
| Example 6 | 2.9 |
| Example 7 | 3.2 |
| Example 8 | 3.3 |
| Example 9 | 3.0 |
| Example 10 | 3.1 |
| Example 11 | 2.9 |
| Example 12 | 3.0 |
| Example 13 | 3.0 |
| Comparative example | 6.1 |

It can be known from Table 4.0 that, under the same testing conditions of concrete, the air contents of the examples are decreased compared to the comparative example, indicating that the new polymer developed in the present invention has suitable air-entraining ability, which is very helpful for later strength improvement of concrete.

What is claimed is:

1. A method for preparing a polymer, comprising
    performing a polycondensation of a polyether macromonomer A, a monomer B and an aldehyde C,
    wherein the polyether macromonomer A has a structural formula (Ia), (Ib), (Ic), or (Id):

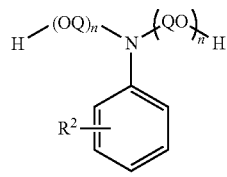

(Ia)

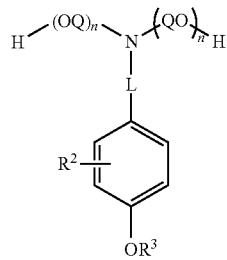

(Ib)

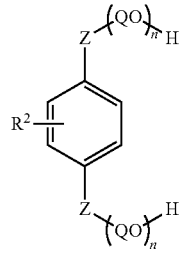

(Ic)

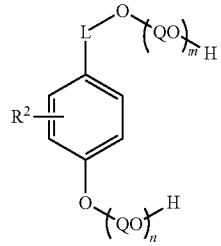

(Id)

in which Z is $NR^3$, O or $O(CH_2)_fO$, L=$O(CH_2)_f$ or $(CH_2)_f$, f is an integer from 1 to 10, Q is C2 to C24 alkylene, $R^2$ is H or C1 to C10 alkyl, $R^3$ is a C1 to C10 alkyl, m=8 to 112, n=8 to 112;

the monomer B p-aminophenylsufonic acid, o-aminophenylsulfonic acid, p-hydroxylbenzoic acid, o-hydroxylbenzoic acid, p-aminobenzoic acid, o-aminobenzoic acid, p-hydroxylphenylsulfonic acid, o-hydroxylphenylsulfonic acid, or has a structural formula (IIa) or (IIb):

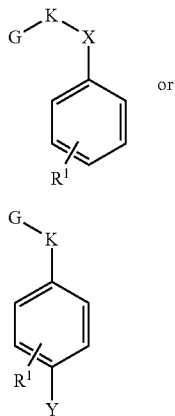

in which G is $N(CH_2—PO_3H_2)_2$, $NH—CH_2PO_3H_2$, $NR^6—CH_2PO_3H_2$, $C(OH)(PO_3H_2)_2$, $CH(OPO_3H_2)CH_2—OPO_3H_{22}$, $OPO_3H_2$, wherein $R^1$ is H, a C1 to C10 alkyl or $SO_3H$,
K is a C1 to C10 alkylene,
X=$NR^8$ or O, Y is OH or $OR^7$, $R^7$ is a C1 to C10 alkyl,
$R^6$ and $R^8$ are independently from each other are a C1 to C10 alkyl,
the aldehyde C has a structural formula (III):

$R^5CHO$ (III)

in which $R^5$ is H, COOH, or a C1 to C10 alkyl; and
a molar ratio of the polyether macromonomer A and the monomer B is 1:0.5 to 1:12,
wherein the polymer has a weight average molecular weight of 4000 g/mol to 150000 g/mol.

2. The method for preparing a polymer of claim 1, wherein,
Z is O or $O(CH_2)_fO$, f=1 to 3;
L is $(CH_2)_f$, f=1 to 3;
Q is C2 to C4 alkylene;
$R^1$ is H or a C1 to C3 alkyl;
$R^2$ is H or a C1 to C3 alkyl;
$R^3$ is a C1 to C3 alkyl;
X is $NR^8$ or O;
$R^8$ is a C1 to C3 alkyl;
Y is OH or $OR^7$;
$R^7$ is preferably a C1 to C3 alkyl;
K is a C1 to C3 alkylene; and
$R^5$ is H, COOH or a C1 to C3 alkyl.

3. The method for preparing the polymer of claim 2, wherein the monomer B has a structural formula (IIa) or (IIb) in which G is $N(CH_2—PO_3H_2)_2$, $C(OH)(PO_3H_2)_2$, or $CH(OPO_3H_2)CH_2—OPO_3H_2$.

4. The method for preparing the polymer of claim 1, wherein the polyether macromonomer A has a molecular weight of 1000 to 10000 g/mol.

5. The method for preparing the polymer of claim 1, wherein a molar ratio of the polyether macromonomer A and the monomer B is 1:1.0 to 1:6.0.

6. The method for preparing the polymer of claim 1, wherein a molar ratio between the aldehyde C and a combinded molar amount of polyether macromonomer A and monomer B is 1.0 to 2.0.

7. The method for preparing the polymer of claim 1, wherein the conditions of the polycondensation are: a reaction temperature of 80 to 140° C. and a reaction time of 1 to 8 h.

8. A method of using the polymer obtained by the method of claim 1 including
using the polymer as a dispersant for an aqueous dispersion of a hydraulic binder and/or a latent hydraulic binder.

9. The method of claim 8, wherein the hydraulic binder is at least one of cement, lime, gypsum, and anhydrous gypsum, and the latent hydraulic binder is pozzolana, fly ash or blast furnace slag.

10. The method for preparing the polymer of claim 1, wherein
the polymer has a weight average molecular weight from 8000 g/mol to 100000 g/mol.

11. The method for reparing the polymer of claim 1, wherein
the polymer has a weight average molecular weight from 10000 g/mol to 40000 g/mol.

12. The method for preparing the polymer of claim 2, wherein
Z is O or $O(CH_2)_fO$, f=1 to 2;
Q is C2 to C3 alkylene;
$R^1$ is H;
$R^2$ is H;
$R^3$ is methyl;
$R^8$ is methyl or ethyl;
$R^7$ is methyl or ethyl; and
$R^5$ is H or COOH.

13. The method for preparing the polymer of claim 3, wherein the monomer B has a structural formula (IIa) or (IIb) in which G is $N(CH_2—PO_3H_2)_2$, or $C(OH)(PO_3H_2)_2$.

14. The method for preparing the polymer of claim 7, wherein the conditions of the polycondensation are: the reaction temperature of 90 to 130° C. and the reaction time of 2 to 6 h.

15. The method of using the polymer of claim 9, wherein the hydraulic binder is cement.

16. The method for preparing the polymer of claim 12, wherein
Z is O;
Q is $CH_2CH_2$;
$R^8$ is methyl;
$R^7$ is methyl; and
$R^5$ is H or COOH.

* * * * *